United States Patent [19]

White

[11] Patent Number: 4,530,405

[45] Date of Patent: Jul. 23, 1985

[54] PLANTER ROW MARKER

[75] Inventor: Gregory S. White, Moline, Ill.

[73] Assignee: Deere & Co., Moline, Ill.

[21] Appl. No.: 592,521

[22] Filed: Mar. 23, 1984

[51] Int. Cl.³ .............................................. A01B 69/02
[52] U.S. Cl. .................................... 172/126; 172/501
[58] Field of Search ............... 172/126, 127, 128, 129,
172/130, 131, 132, 456, 311, 501; 298/22 R, 22 P, 22 B

[56] References Cited

U.S. PATENT DOCUMENTS

| | | |
|---|---|---|
| 895,507 | 8/1908 | Smith . |
| 3,072,200 | 1/1963 | Yerkes ................................. 172/126 |
| 3,650,333 | 3/1972 | Fueslein ............................... 172/311 |
| 3,666,019 | 5/1972 | Yeske . |
| 3,766,987 | 10/1973 | Orthman ............................. 172/126 |
| 4,047,575 | 9/1977 | Wagner ................................ 172/456 |
| 4,074,766 | 2/1978 | Orthman . |
| 4,207,950 | 6/1980 | Kinzenbaw . |
| 4,232,747 | 11/1980 | Pfenninger ........................... 172/501 |

FOREIGN PATENT DOCUMENTS 2216014 10/1973 Fed. Rep. of Germany ...... 172/130

OTHER PUBLICATIONS

Avco New Idea, Single Frame Planters, Form No. 8330-1, undated.

Primary Examiner—Richard J. Johnson
Attorney, Agent, or Firm—Henderson & Sturm

[57] ABSTRACT

A row marker for a planting implement having a floatation slot formed in an extendable marker link arm. The link arm slot is generally longitudinal to the link arm and has a transverse hooked portion at the outer end. Engagement of the end pin of an activating hydraulic cylinder in the hook portion results in a smooth even motion of the marker as it moves from the vertical position to the normal working position. Use of a spring tensioned cable simultaneously provides for full marker arm extension prior to reaching the working position and clear marking through the full range of floatation.

2 Claims, 4 Drawing Figures

PLANTER ROW MARKER

TECHNICAL FIELD

This invention relates to row markers for planting implements, and more particularly to row markers that move or float with the contour of the ground.

BACKGROUND ART

Planter row markers that float with the contour of the ground provide a continuous visible marking that aids the operator in the planting process. Presently known floating row markers use a straight slotted engagement of the activating hydraulic cylinder end pin. While the straight slot does allow for floating of the marker with the ground contour, its use also results in an undesirable jump or free fall of the marker as the marker initially moves from the vertical position. Also, presently known floating row markers using a cable connection present special problems. If the cable is adjusted so the marker will completely unfold above the ground, the cable will be too short to allow the marker to go to its normal working position. If the cable is adjusted to the full range of floatation, the marker disk will contact the ground before the marker is completely unfolded resulting in the disk ends pushing soil to unfold into the ground possibly resulting in structural damage.

Those concerned with these and other problems recognize the need for an improved planter row marker.

DISCLOSURE OF THE INVENTION

The present invention provides a planter row marker having a floatation slot in the link arm connected to the actuating hydraulic cylinder. The slot has a hooked portion in the outer end which quickly engages the end pin of the cylinder as it is retracted. This rapid engagement eliminates the jump or free fall associated with known floatation slots.

The row marker of the present invention also employs a spring tensioned cable to fully extend the outer link arm before the marker descends to its normal working position where the marker disk contacts the soil. The tension spring allows use of a short cable to effect full extension before reaching the working position, while at the same time providing the extra stretched length needed to assure a clear marking throughout the full floatation range allowed by the slot.

An object of the present invention is the provision of an improved planter row marker.

Another object is to provide a planter row marker that floats with the contour of the ground.

A further object of the invention is the provision of planter row markers that unfold in a smooth even manner.

Still another object is to provide a planter row marker that fully extends before reaching the normal working position.

A still further object of the present invention is the provision of planter row markers that produce a clear visible marking.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
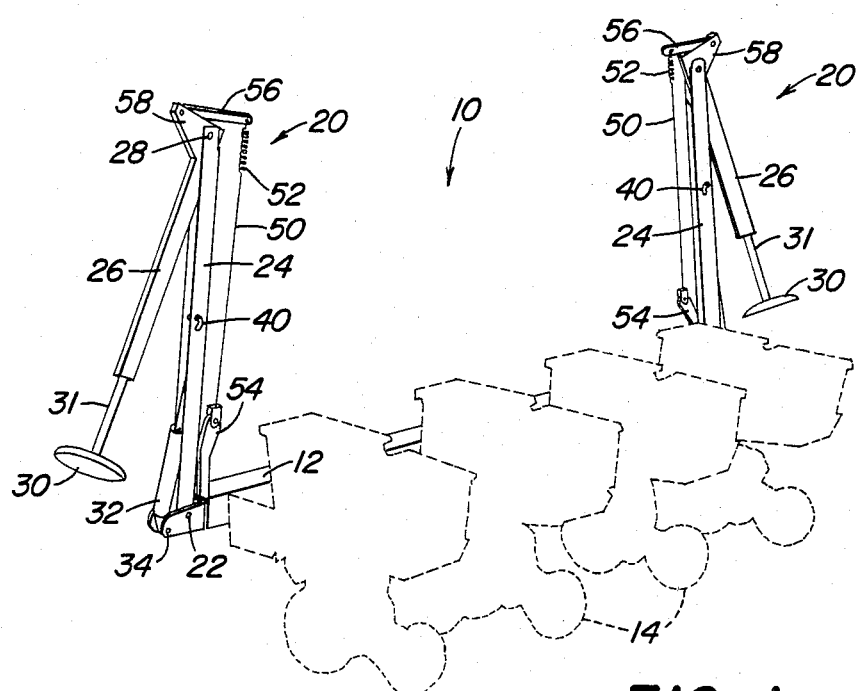
FIG. 1 is a perspective view showing row markers attached to opposite ends of a frame, and showing, in dashed lines, a plurality of planter units attached to the main frame.

Referring now to the drawings, wherein like reference numerals designate identical or corresponding parts throughout the several views, FIG. 1 shows a planting implement (10) including a frame (12) having a plurality of planting units (14) attached thereto. Each end of the frame (12) carries a row marker (20) pivotally attached by a horizontal pin (22). The row markers (20) include an inner link arm (24) and an outer link arm (26) pivotally attached by pin (28). The marker disk blade (30) is mounted on an arm tube (31) which is conventionally adjustable with respect to outer link (26) to properly position the marker disk (30) for use in conjunction with various row width settings.

Figure 4:
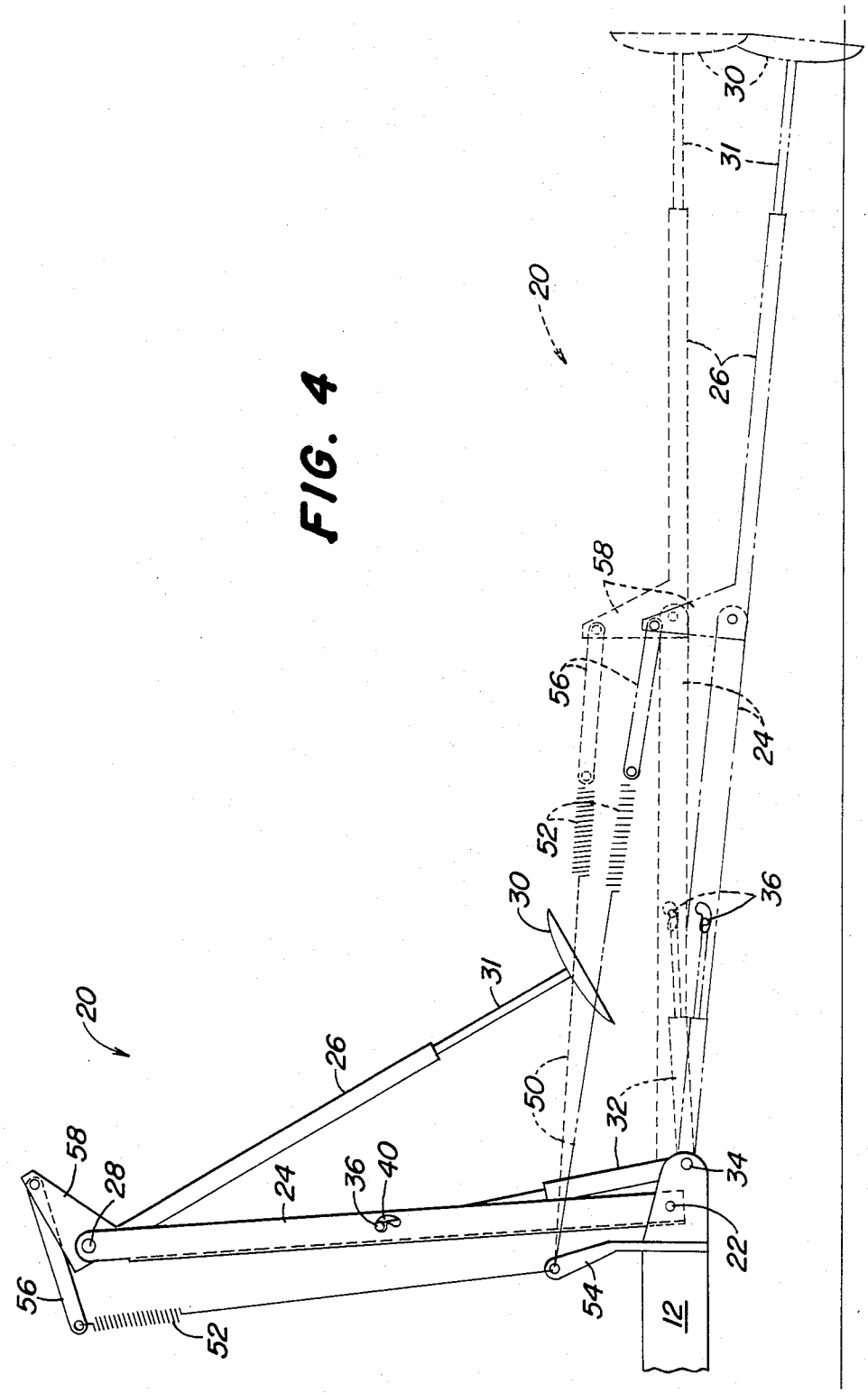
FIG. 4 is a front elevational view showing the row marker in the raised position, a horizontal completely unfolded position (dashed lines), and the normal working position (dashed lines).

A hydraulic cylinder (32) is pivotally connected by pin (34) to the frame (12) and by cylinder end pin (36) to the slot (40) in inner link arm (24). Selective activation of the cylinder (32) moves the row marker (20) between the vertical raised position and the lowered working position as generally shown in FIG. 4.

The outer link arm (26) is extended laterally from the frame (12) as the cylinder (32) moves the row marker (20) toward the lowered working position. The cable (50) and attached tension spring (52) is connected between a frame offset strap (54) and a pin offset strap (56). Pin offset strap (56) is, in turn, pivotally attached to the lever plate (58) that extends up from one end of the outer link arm (26). As the row marker (20) is lowered the force exerted on the lever plate (58) acts to pivot the outer link arm (26) about pin (28) until it reaches a stop (not shown) at the fully extended horizontal position shown in FIG. 4.

The configuration of the slot (40) of the inner link arm (24) is important to the smooth efficient operation of the row marker (20). The slot (40) is disposed generally longitudinally to the inner link (24) but the slot (40) also has a generally transverse hooked portion (42) at the outer end (FIGS. 2 and 3).

Figure 2:
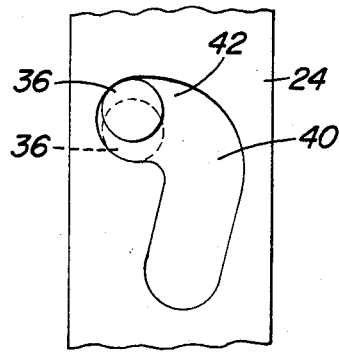
FIG. 2 is a cut-away front elevational view of a portion of the inner link of a foldable marker arm when the inner link and marker are in the raised vertical position, the view showing a substantially longitudinal slot with a transverse hook at the outer end and the position of the hydraulic cylinder end pin within the hooked portion.
Figure 3:
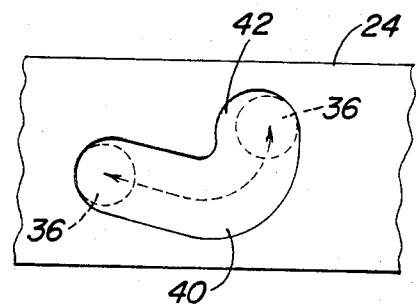
FIG. 3 is a cut-away front elevational view of a portion of the inner link of a foldable marker arm similar to FIG. 2 but where the inner link and marker are in the lowered horizontal working position, the view showing the range of travel of the hydraulic cylinder end pin within the slot formed in the inner link.

In operation, when it is desired to move the row marker (20) from the vertical raised position, the hydraulic cylinder (32) is activated to retract and move the cylinder end pin (36) downward in the hooked portion (42) of the slot (40) as shown best in FIG. 2. When the end pin (36) is in the dashed line position of FIG. 2, it exerts a force on the inner link arm (24) and it begins to pivot about pin (22) toward the desired working position in a smooth even descent. As the row marker (20) approaches the working position, the end pin (36) is no longer restricted by the hook portion (42) and is free to travel within the slot (40) as illustrated in FIG. 3.

The tension spring (52) attached to the cable (50) also contributes to the efficient operation of the row marker (20) by providing for full extension of the outer link arm (26) before the disk (30) contacts the ground. This full extension is accomplished when the row marker reaches the horizontal position shown in dashed lines in FIG. 4, at which point the spring (52) is not stretched. The spring (52) begins to stretch when the row marker (20) reaches the normal working position illustrated by the lowermost dashed line representation in FIG. 4. The spring (52) also stretches when the disk (30) floats below the normal working position as it follows the contour of the land.

The row marker (20) is raised by activation to extend the hydraulic cylinder (32) which causes the inner link arm (24) to pivot about pin (22) in an upward direction.

It can be understood that the hooked slot insures a smooth folding row marker that overcomes the problem of jumpy, uneven operation. Also, use of the spring tensioned cable provides for full extension of the marker and extra length that allows clear marking throughout the full floatation range of the slot.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a row marker for use in conjunction with a planting implement including a plurality of planting units attached to a frame, a foldable support arm attached to the frame, a marker disk blade attached to the end of the vertically foldable support arm, a hydraulic cylinder interconnecting the frame and an inner link of the foldable support arm for selectively moving the row marker between a raised position and a lowered working position, and a cable interconnecting the frame and an outer link of the foldable support arm for selectively extending the outer link when the row marker moves toward its lowered working position, the improvement comprising:

an inner link arm having a slot to receive an end pin carried by the hydraulic cylinder, said slot being disposed to slideably receive said end pin and being defined by a path generally longitudinal to the inner link and having a generally transverse hooked portion at the outer end thereof.

2. The row marker of claim 1, further including a tension spring attached to said cable and disposed between said frame and said outer link, whereby the outer link is fully extended before the said row marker reaches said lowered working position.

* * * * *